United States Patent

[11] 3,533,341

[72] Inventor Elmer J. Bury
 Wheaton, Illinois
[21] Appl. No. 769,272
[22] Filed Oct. 21, 1968
[45] Patented Oct. 13, 1970
[73] Assignee by mesne assignments to the United States of America as represented by the Secretary of the Navy

[54] BRAKING DEVICE FOR CONTROLLING RETURN OF A CAMERA PLATEN
 2 Claims, 1 Drawing Fig.
[52] U.S. Cl. .................................................. 95/12.5
[51] Int. Cl. ............................................ G03b 39/04
[50] Field of Search ........................................ 95/12.5
 (Consult: Horan)

[56] References Cited
UNITED STATES PATENTS
2,713,814 7/1955 Sonne et al. .................. 95/12.5

Primary Examiner—John M. Horan
Assistant Examiner—M. L. Gellner
Attorneys—Edgar J. Brower, H. H. Losche and Paul S. Collignon ABSTRACT: A tape is wound on a drum controlled by a motor and clutch arrangement to move a camera platen for image motion compensation. An auxiliary return movement of the platen under influence of a spring by utilizing the motor as a braking device.

Patented Oct. 13, 1970
3,533,341
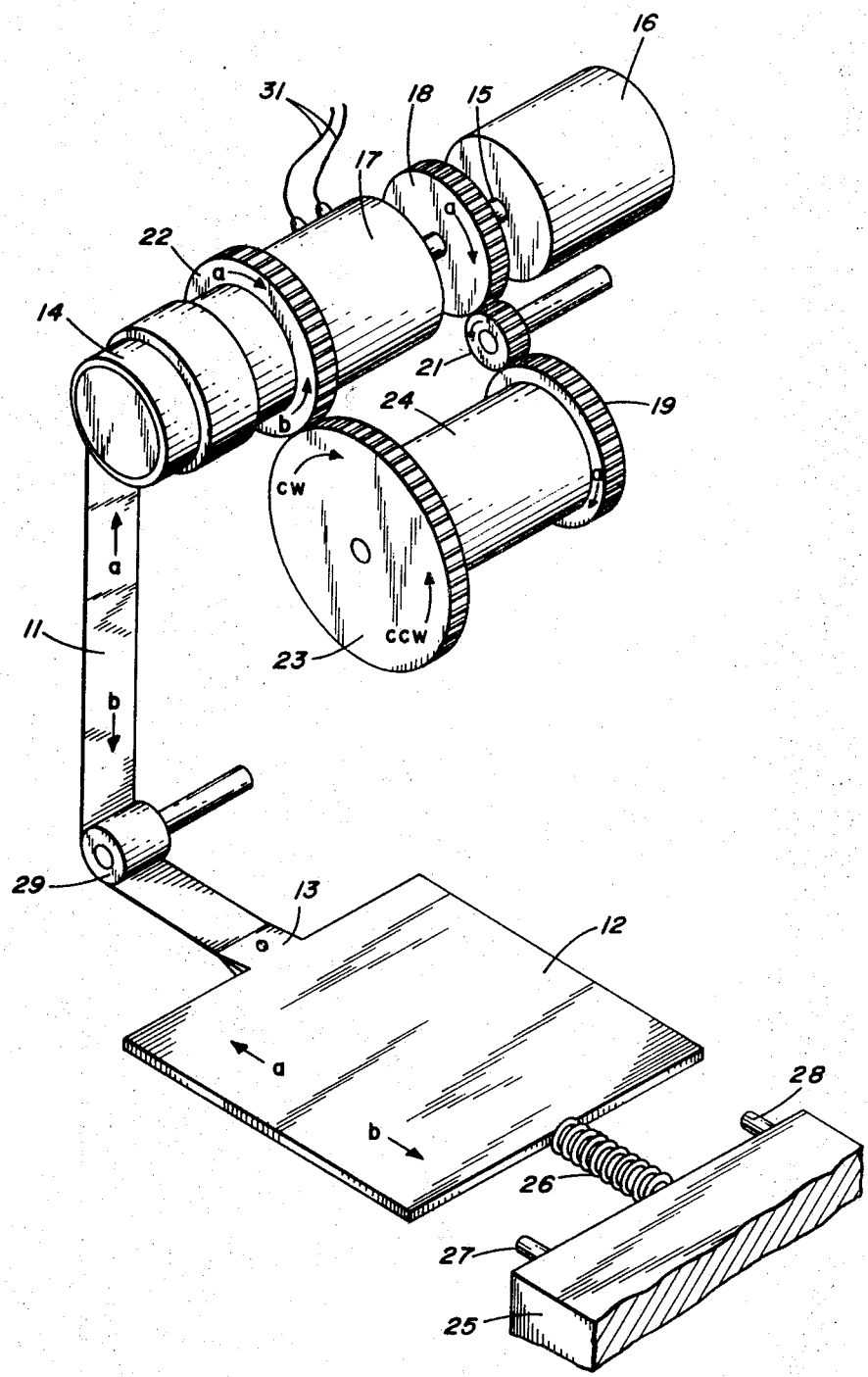
INVENTOR
ELMER J. BURY
BY H. H. Losche
Paul S. Collignon
ATTORNEYS

BRAKING DEVICE FOR CONTROLLING RETURN OF A CAMERA PLATEN

BACKGROUND OF THE INVENTION

The present invention relates to means for controlling the movement of a platen in a camera, and more particularly to a device for controlling the velocity of a camera platen during its return to an initial position.

The technique of image motion compensation is well-known in the art of aerial photography as a means of providing a clear photographic image of a stationary object being passed by a camera at a relatively high velocity. One common method of accomplishing image motion compensation is to move the film during exposure thereby forming a temporary stationary relationship between film and the object being photographed. Various considerations, both mechanical and photographic, make it advisable that a platen also move along with the film.

A typical image motion compensation system will provide for movement of film, platen and a format frame as a unit during exposure. For focusing purposes, the film is held firmly against the platen during movement as, for example, by a partial vacuum applied through the platen. A format frame on the opposite side of the film from the platen establishes the area of film to be exposed. A typical exposure cycle requires the platen to press against the film, travel with the film during exposure, release the film and return the platen to its initial starting position.

During exposure of the film, the platen may be moved by a drum and tape drive assembly which is powered by a motor and synchronized with a film drive mechanism. The return of the platen to its initial position is generally accomplished by one or more springs. It has been found, however, that the uncontrolled force of springs tends to make the platen bounce when it reaches the stops that define its initial starting position. With the relatively high cycling rates common in aerial photography, this bounce causes the platen to be out of position at the initiation of the next cycle, and thus improper framing of the next succeeding exposure results.

SUMMARY OF THE INVENTION

In the present invention, a thin flexible tape has one end attached to a platen and the other end is attached to a cylindrical drum. The drum is driven by a motor through a clutch, such as a magnetic clutch, and when the clutch is engaged, the motor rotates the drum thereby causing the tape to be wound upon the drum and imparting linear motion to the platen. A spring is attached to one end of the platen, and the linear motion of the platen imparted by the tape being wound upon the drum causes the spring to be deflected. Upon disengaging of the clutch, the force of the spring tends to return the platen to its initial position, however, an auxiliary gear train is connected through a one-way clutch between the drum and motor and the rotation of the motor serves as a brake to regulate the speed at which the drum can be turned and thus regulate the return speed of the platen to its initial position.

It is therefore a general object of the present invention to provide a speed control mechanism which will regulate the return velocity of a platen to its initial position.

Other objects and advantages of the present invention will be readily appreciated as the same becomes better understood by reference to the following detailed description when considered in connection with the accompanying drawing.

BRIEF DESCRIPTION OF THE DRAWING

The figure of the drawing is a diagrammatic view of a preferred embodiment of the present invention.

DESCRIPTION OF THE PREFERRED EMBODIMENT

Referring now to the drawing, a thin flexible tape 11 has one end attached to platen 12 by means of clamp 13, and the other end of tape 11 is attached to cylindrical drum 14. An output shaft 15 of motor 16 is coupled through a clutch 17 to intermittently drive drum 14. By way of example, clutch 17 might be of a magnetic type which are well-known in the art. One such magnetic clutch is described on pages 105—112 in the text, Precision Mechanical Components, by Winfred M. Berg, Russell E. Sachen, Inc., Publisher, 1965. In this clutch, input and output shafts have fixed magnetic cylinders attached to adjacent ends and the output shaft is free to slide axially along its shaft. Under the action of an applied magnetic field, the output cylinder makes strong physical contact with the input cylinder, thus coupling the two shafts. Rotation of the input shaft results in rotation of the output shaft. Upon removal of the magnetic field, a spring forces the output cylinder away from the input cylinder and opens the coupling.

Another type of magnetic clutch, known as a magnetic particle clutch, is shown and described on page 162 of the text, Mechanism, by Joseph Beggs, McGraw-Hill Co., 1955. In a magnetic particle clutch, a narrow gap is provided between the driving and driven members and the gap is filled with powdered iron and graphite. When a magnetic field is applied across the gap, the iron particles form chains across the gap to connect the driving and driven members.

A gear 18 is attached to output shaft 15 of motor 16 and drives gear 19 through idler gear 21. Gear 22 is attached to drum 14 and drives gear 23. Gears 19 and 23 are connected by a one-way clutch 24. Clutch 24 is constructed and arranged such that when gears 19 and 23 are rotated in the same direction, clutch 24 is engaged and gears 19 and 23 are directly coupled together. When gears 19 and 23 are rotated in opposite directions, however, clutch 24 is constructed and arranged to slip and there is no coupling between gears 19 and 23. By way of example, clutch 24 might be of the type shown and described in U.S. Pat. No. 2,633,951, which issued Apr. 7, 1953, to E. F. Ayer and S. P. Caldwell.

As shown in the drawing, platen 12 is connected to a stationary member 25 by means of spring 26. The action of spring 26 opposes that of the drum and tape drive assembly and, when clutch 17 is not engaged, spring 26 pulls platen 12 against stops 27 and 28 which are attached to stationary member 25. The opposing forces on platen 12 are maintained in a common plane by a device such as idler roller 29, which is used to guide tape 11.

OPERATION

In operation, assuming that output shaft 15 is driven in a clockwise direction by motor 16, then gear 18 would be driven in direction "a", or a clockwise direction. Gear 19 which is driven by gear 18 through idler gear 21, would also rotate in direction "a" or a clockwise direction. Upon energizing magnetic clutch 17 by the application of direct current, drum 14 is rotated by output shaft 15 of motor 16 and tape 11 is wound onto drum 14. As one end of tape 11 is attached to platen 12, the winding of tape 11 onto drum 14 causes platen 12 to move in direction "a", away from stationary member 25, and spring 26 is stretched or deformed. While platen 12 is moving in direction "a", a strip of film (not shown) is also being moved in direction "a" to provide image motion compensation. As gear 22 is attached to drum 14, rotation of drum 14 causes gear 22 to drive gear 23 in a counterclockwise direction, and as one-way clutch 24 is arranged to slip when gear 23 is rotating in a counterclockwise direction, there is no driving relationship between gears 19 and 23.

Platen 12 moves a relatively short distance while the film is being exposed, and then clutch 17 is deenergized thereby uncoupling drum 14 from output shaft 15 of motor 16. Spring 26 then acts to move platen 12 in direction "b", toward stationary member 25 and causes tape 11 to be unwound from drum 14 thereby causing drum 14 to be rotated in a counterclockwise direction. Gear 22, which is attached to drum 14, turns in a counterclockwise direction and rotates gear 23 in a clockwise direction. Gear 18 is still being driven by motor 16 in a clockwise direction and also gear 19, which is driven by gear 18 through idler gear 21, rotates in a clockwise direction. One-way clutch 24 is constructed and arranged so that it will be engaged when gears 18 and 23 are both turning in a clockwise direction. Thus when gear 22 drives gear 23, the speed of motor 16 controls the speed of gear 23 as motor 16 and gears 18, 21, and 19 serve, in effect, as a brake or speed regulator to control the unwinding of tape 11 from drum 14.

When platen 12 reaches stops 27 and 28, tape 11 stops moving and thus drum 14 and gear 22 are no longer rotated. Gear 23 is also stopped and one-way clutch 24 slips while gear 19 continues to rotate. Platen 12 has thus been returned to its initial position in a controlled manner with no resulting bounce and is immediately ready for another cycle.

It can thus be seen that the present invention provides an improved device for regulating the return of a camera platen to its initial position. Obviously many modifications and variations of the present invention are possible in the light of the above teachings. It is therefore to be understood, that within the scope of the appended claims, the invention may be practiced otherwise than as specifically described.

I claim:
1. A speed control device comprising:
a camera platen;
spring means for biasing said camera platen against a stationary member;
a cylindrical drum supported for rotation;
tape means for moving said camera platen, said tape means having one end attached to said cylindrical drum and one end to said camera platen;
a motor including a shaft;
first clutch means for intermittently connecting said shaft of said motor with said cylindrical drum;
a one-way clutch having first and second input means, said one-way clutch being constructed and arranged to be engaged when said first and second input means are rotating in the same direction and to be disengaged when said first and second input means are rotating in opposite directions;
a first gear train connecting said shaft of said motor with said first input means of said one-way clutch; and
a second gear train connecting said cylindrical drum with said second input means of said one-way clutch whereby said motor drives said drum in one direction and operates as a braking device when said drum is rotated by said spring means in an opposite direction.

2. A speed control device as set forth in claim 1 wherein said first clutch means is a magnetically operated clutch.